United States Patent Office 2,857,342
Patented Oct. 21, 1958

2,857,342

STEEPING PROCESS FOR THE PREPARATION OF FOAMABLE STYRENE POLYMER PARTICLES

Norbert Platzer, Springfield, Mass., assignor to Monsanto Chemical Company, St. Louis, Mo., a corporation of Delaware No Drawing. Application April 25, 1956
Serial No. 580,669

6 Claims. (Cl. 260—2.5)

The present invention relates to a method for preparing foamable styrene polymer particles and the products so prepared. More particularly, the present invention relates to an improved process for preparing foamable styrene polymer particles by steeping styrene polymer particles in a volatile aliphatic hydrocarbon.

Styrene polymer foams constitute a valuable class of materials which are finding increasingly wide application in the fabrication of numerous industrial and consumer articles such as life belts, insulation partitions, novelties, etc. A leading method for fabricating such foams involves placing small particles of a foamable styrene polymer in a mold and heating to foam the styrene polymer particles which fuse together to form a unitary structure. One method for preparing foamable styrene polymer particles comprises steeping styrene polymer particles in a volatile aliphatic hydrocarbon such as pentane, petroleum ethers, etc. until the styrene polymer particles have absorbed the desired quantity of hydrocarbon, e. g., 5–10 weight percent. This process is extremely time consuming and up to 30 days may be required to absorb a sufficient quantity of the volatile aliphatic hydrocarbon, cf. Example V of U. S. 2,681,321. Moreover, the styrene polymer foams prepared from such foamable styrene polymer particles frequently are not as homogeneous as desired and may have an undesirably large cell size.

It is an object of this invention to provide an improved method for incorporating a volatile aliphatic hydrocarbon in styrene polymer particles.

Another object of this invention is to provide novel foamable styrene polymer particles having a volatile aliphatic hydrocarbon homogeneously incorporated therein.

Other objects and advantages of this invention will become apparent from the following detailed description thereof.

In accordance with the present invention, foamable styrene polymer particles are prepared by incorporating a finely divided insoluble organic pigment in a styrene polymer, comminuting the polymer composition into small particles and steeping said particles in a volatile aliphatic hydrocarbon boiling in the range of from about 10° C. to about 80° C. The organic pigment incorporated in the styrene polymer may be of any chemical type provided only that it be insoluble in the styrene polymer and that it be finely ground, preferably to a size of 5 microns or less. Surprisingly, the styrene polymer particles containing small quantities of such finely divided insoluble organic pigments will absorb the volatile aliphatic hydrocarbon materially faster than will particles of a pigment-free styrene polymer. Moreover, the styrene polymer foams prepared from the foamable styrene polymer particles of this invention are more homogeneous and have superior physical properties to styrene polymer foams that are prepared from comparable foamable styrene particles which do not contain a finely divided polymer-insoluble organic pigment.

The following examples are set forth to illustrate more clearly the principle and practice of this invention to those skilled in the art. All parts are by weight.

EXAMPLE I

Part A

One-half part of a green chlorinated copper phthalocyanine pigment having an average particle size of 0.02 micron is admixed with 100 parts of a finely ground polystyrene having a molecular weight of 65,000. The externally blended mixture is put through a heated extruder to obtain a uniform distribution of the pigment throughout the resin. The extruded strands are ground to a particle size of 8–20 mesh.

Part B

Part A is repeated employing a blue copper phthalocyanine pigment having an average particle size of less than 1 micron in lieu of the chlorinated copper phthalocyanine pigment of Part A.

Part C

Part A is repeated employing a pink 6,6' dichloro-4,4' dimethyl-2,2' bis-thionaphthen-indigo pigment having an average particle size of less than 1 micron in lieu of the chlorinate copper phthalocyanine pigment of part A.

Part D

Part A is repeated employing a finely ground scarlet pigment having an average particle size of less than 1 micron in lieu of the green copper phthalocyanine pigment of Part A. Chemically, the scarlet pigment is the barium salt of the o-carboxylic acid of benzene-azo-beta-naphthol-3,6-disulfonic acid.

Part E

The styrene polymer employed in Part A is extruded as in Part A, but without incorporating any pigment therein. The extruded polymer strands are ground to a particle size of 8–20 mesh.

EXAMPLE II

The ground polymers of Example I, Parts A, B, C, D and E are separately steeped in n-pentane at 25° C. under agitation for 24 hours. The polymers having the insoluble organic pigments incorporated therein absorb nearly twice as much pentane as does the polymer of Example I, Part E, which contains no organic pigment.

The foamable styrene polymers described in the paragraph above are foamed by placing the foamable polymer particles in boiling water. The foamable polymer particles containing no organic pigment give a foam having a density of approximately 9 pounds per cubic foot, whereas the foamable polymer particles containing the insoluble organic pigments give a foam having a density of approximately 2–3 pounds per cubic foot.

EXAMPLE III

The foamable styrene polymer particles of Example I, Part A and control foamable styrene particles containing no organic pigment are steeped in n-pentane as described in Example II, placed in sealed glass jars and stored for two weeks. The control styrene polymer particles are steeped for a time sufficient to absorb the same quantity of pentane as the pigmented polymer. At the end of the two week period, foams are prepared from the two samples by placing the foamable polymer particles in a mold and introducing live steam into the mold. The foam prepared from the control foamable styrene particles containing no organic pigment has a relatively coarse structure with the individual cells having an average diameter of 0.05–0.08 inch, whereas the foam prepared from the foamable styrene polymer particles containing the green chlorinated copper phthalocyanine pigment has a fine structure with the individual cells having an average diameter of 0.01–0.03 inch. Flexural strength and modulus of elasticity values are determined on the foams (having a density of 2 pounds per cubic foot) by ASTM procedure D–790–49T and are set forth below in Table I.

TABLE I

| Organic Pigment in Foamable Particles | Flexural Strength, p. s. i. | Modulus, p. s. i. |
|---|---|---|
| None | 13 | 235 |
| Chlorinated Copper Phthalocyanine | 45 | 2,000 |

The insoluble organic pigment incorporated in the styrene polymer may be of any chemical type (including metal salts of organic acids) provided that it is finely divided and is insoluble in the styrene polymer. The term "pigment" is used in its ordinary sense of denoting a compound having tinctorial properties. In general, the insoluble organic pigment employed should have an average particle size of 5 microns or less and especially good results are obtained when the pigment has an average particle size of 1 micron or less. The organic pigment is considered to be insoluble in the styrene polymer when less than 0.5 part of the pigment is soluble in 100 parts styrene polymer. Because of the experimental difficulties involved, the solubilities of the organic pigments are determined by indirect methods rather than by directly measuring the solubility of the pigment in the styrene polymer. Where the average particle size of the organic pigment is at least 0.1 micron, the solubility of the organic pigment can be determined by measuring the haze of 100 parts of the styrene polymer containing 0.5 part of the pigment by ASTM procedure D–10003–52. The organic pigment is considered to be insoluble if a 50 gauge sheet of the pigmented stock has a haze value of 5% or more. As an alternative method, the solubility of the organic pigment can be measured by dispersing 0.5 part of the pigment in 100 parts of styrene monomer. If the pigment does not dissolve completely in 24 hours at room temperature, the pigment is insoluble in the styrene polymer.

Typical examples of the insoluble organic pigments that may be employed in the practice of this invention include, in addition to the specific pigments set forth in Example I, the phthalocyanine pigments as a generic class and the calcium, barium, strontium and cadmium salts of azo compounds containing the structural grouping:

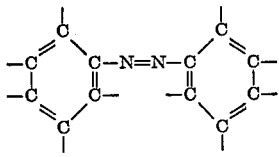

In the above structural grouping at least one of the valences of each of the aromatic rings is satisfied with a radical of the group —COOH, —OH and —SO$_3$H. Pigments containing the above structural grouping constitute a well recognized class of organic colorants which are known generically in the styrene polymer art as "azo pigments." Typical examples of such azo pigments include the calcium, strontium and cadmium salts of the diazo coupling products of benzoic acid and beta-hydroxy naphthalene disulfonic acid, the diazo coupling product of aminobenzoic acid and beta-hydroxynaphthoic acid, the diazo coupling product of 6-chloro-m-toluidine-4-sulfonic acid and beta-hydroxy naphthalene disulfonic acid, etc.

The styrene polymers in which the finely divided insoluble organic pigments are incorporated are homopolymers of styrene and interpolymers of styrene containing at least 85 weight percent of styrene. Any comonomer interpolymerizable with the styrene should be free of inorganic and other polar substituents and will contain only the elements carbon, hydrogen and sometimes oxygen. Examples of such comonomers include butadiene and the acrylate and methacrylate esters. All or a part of the styrene may be replaced with its closely related homologues such as alpha-methylstyrene, p-methylstyrene, p-ethylstyrene, 2,4-dimethylstyrene, etc.

Only a small quantity of the finely divided insoluble organic pigment need be incorporated in the styrene polymer to materially accelerate the rate at which the styrene polymer will absorb the volatile aliphatic hydrocarbon when steeped therein. As little as 0.1 part of the insoluble organic pigment in 100 parts of styrene polymer materially accelerates the rate of hydrocarbon absorption. The incorporation of more than about 1 part of the insoluble organic pigment in 100 parts of styrene polymer has little or no further effect in accelerating the rate of hydrocarbon absorption, but additional quantities of the insoluble organic pigment may be incorporated in the polymer to provide more intense colors if desired.

The insoluble organic pigment may be incorporated in the styrene polymer by conventional mixing methods or, if desired, in some cases the insoluble organic pigment may be incorporated in the styrene monomer before it is polymerized.

The volatile aliphatic hydrocarbons employed to steep the particles of styrene polymer containing the finely divided insoluble organic pigment boil within the range of from about 10° C. to about 80° C. and preferably within the range of from about 30° C. to about 60° C. Examples of such hydrocarbons include pentane, cyclopentane, heptane, petroleum ethers boiling within the previously described temperature ranges, etc. It is permissible, and in some cases desirable, to admix other volatile organic liquids with the volatile aliphatic hydrocarbon. In particular, good results frequently are obtained employing mixtures of volatile aliphatic hydrocarbons and lower halogenated hydrocarbons such as methylene chloride.

The steeping process employed is conventional except for the insoluble organic pigment incorporated in the styrene polymer particles. For an optimum rate of hydrocarbon absorption, the styrene polymer particles should be comminuted to a fine particle size, e. g., less than about 10 mesh. In addition, the rate of hydrocarbon absorption is dependent on the temperature which may range from about 0° C. to the boiling point of the hydrocarbon or even higher if the absorption step is carried out under pressure. At room temperature or above sufficient agitation should be provided to prevent agglomeration of the styrene polymer particles.

The above descriptions and particularly the examples are set forth by way of illustration only. Many other modifications and variations thereof can be made without departing from the spirit and scope of the invention herein described.

What is claimed is:

1. The method for preparing foamable particles of a styrene polymer which consists of steeping particles of a styrene polymer composition in a liquid aliphatic hydrocarbon boiling within the range of about 10–80° C.; said styrene polymer composition consisting of 100 parts of a styrene polymer having about 0.1–1.0 part of a finely divided organic pigment intimately incorporated throughout the styrene polymer; said styrene polymer being selected from the group consisting of (a) a homopolymer of a monomer selected from the group consisting of styrene, vinyl toluene, p-ethylstyrene and 2,4-dimethylstyrene, (b) an interpolymer consisting solely of at least two monomers selected from the group consisting of styrene, alpha-methylstyrene, vinyl toluene, p-ethylstyrene and 2,4-dimethylstyrene, and (c) an interpolymer of at least 85 weight percent of a monomer selected from the group consisting of styrene, alpha-methylstyrene, vinyl toluene, p-ethylstyrene, 2,4-dimethylstyrene and mixtures thereof with up to 15 weight percent butadiene; said organic pigment being insoluble in the styrene polymer and having an average particle size of less than about 5 microns; the particles of said styrene polymer composition having an average particle size of less than about 10 mesh.

2. The method of claim 1 in which the insoluble organic pigment is intimately incorporated in 100 parts of a styrene homopolymer.

3. The method of claim 2 in which the insoluble organic pigment incorporated in the styrene homopolymer is chlorinated copper phthalocyanine.

4. The method of claim 2 in which the insoluble organic pigment incorporated in the styrene homopolymer is copper phthalocyanine.

5. The method of claim 2 in which the insoluble organic pigment incorporated in the styrene homopolymer is 6,6'-dichloro-4,4-dimethyl-2,2'-bisthionaphthenindigo.

6. The method of claim 2 in which the insoluble organic pigment incorporated in the styrene homopolymer is the barium sodium salt of the ortho-carboxylic acid of benzene-azo-beta-naphthol-3,6-disulfonic acid.

References Cited in the file of this patent

UNITED STATES PATENTS

| | | |
|---|---|---|
| 2,470,001 | Stober | May 10, 1949 |
| 2,489,226 | Morris et al. | Nov. 22, 1949 |
| 2,681,321 | Stastny et al. | June 15, 1954 |
| 2,744,291 | Stastny et al. | May 8, 1956 |